No. 820,105. PATENTED MAY 8, 1906.
G. W. FRAZIER.
ELECTROLYTIC SHIP BOTTOM CLEANER.
APPLICATION FILED OCT. 30, 1903. RENEWED MAR. 20, 1906.
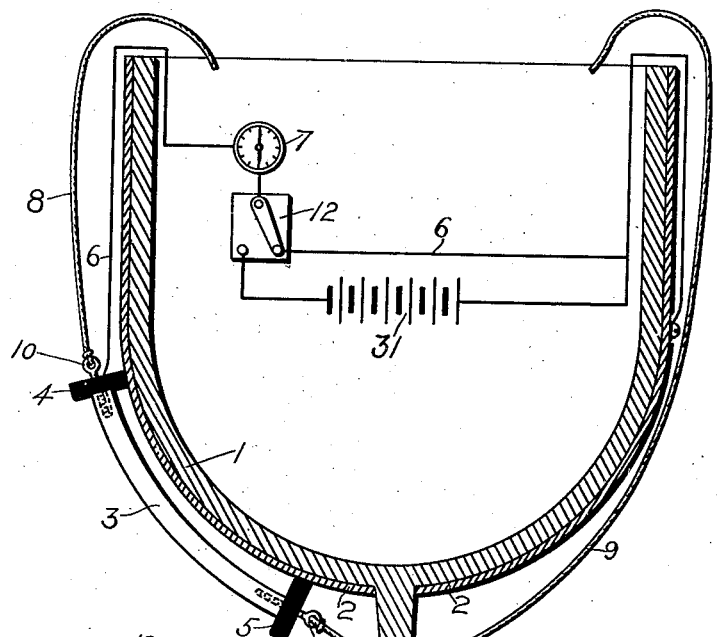
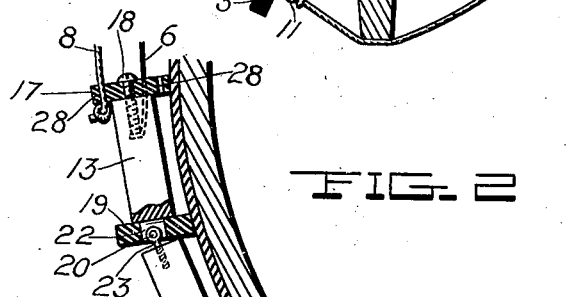
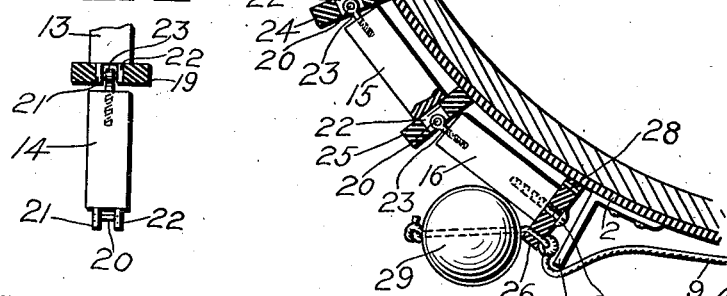
Witnesses
Inventor
George W. Frazier,
By Edwin Guthrie.
Attorney

UNITED STATES PATENT OFFICE.

GEORGE W. FRAZIER, OF ALLEGHENY, PENNSYLVANIA, ASSIGNOR TO PITTSBURGH ELECTROLYTIC MANUFACTURING COMPANY, OF PITTSBURG, PENNSYLVANIA, A CORPORATION OF PENNSYLVANIA.

ELECTROLYTIC SHIP-BOTTOM CLEANER.

No. 820,105.  Specification of Letters Patent.  Patented May 8, 1906.

Application filed October 30, 1903. Renewed March 20, 1906. Serial No. 307,084. REISSUED

*To all whom it may concern:*

Be it known that I, GEORGE W. FRAZIER, a citizen of the United States, residing at Allegheny, in the county of Allegheny and State of Pennsylvania, have invented certain new and useful Improvements in Electrolytic Ship-Bottom Cleaners, of which the following is a specification.

My invention relates to electrolytic ship-bottom cleaners, and has for its object the production of easily constructed, applied, and manipulated apparatus for electrically removing without docking the vessels the combined or collective results of oxidation, animal and plant growths that foul the copper sheathing and steel bottoms in sea-water.

The above object I accomplish by suspending from a vessel adjacent to its sheathing one or more zinc plates curved to follow the sides and bilge of a ship or a succession of plates pivotally joined in electrical continuity. Suitable tackle is attached to the plates for the purpose of moving them up or down and either way along the side. Metallic contact between the zinc plates and the sheathing is prevented by fenders of insulating substance, the positions of the fenders depending somewhat upon the contour of the vessel. Insulated wire conductors lead aboard with the tackle from the plates and are connected directly or through a galvanometer with conductors from the copper sheathing or other metal side of the boat. Where there are bilge-keels or other projecting keel, I employ one or more floats to compel the chain of plates to conform to the curve of the side.

By employing the constructions stated a ship at anchor forms the copper plate of a galvanic battery, the other plate being the zinc, and the sea the acting fluid. A current of considerable quantity is set up, and its decomposing action is found to loosen the oxid skin of the sheathing, bringing with it any attached animal or vegetable growths. An additional current from a suitable source increases the cleansing action, if haste is necessary in any instance, and the usual motion of the vessel riding upon the waves or proceeding at slow speed tends to assist in detaching the refuse.

In the accompanying drawings like numerals designate like parts throughout, in which—

Figure 1 represents the outline of a cross-section of a vessel of customary form with my invention applied, showing the conductors and operating-tackle. Fig. 2 represents an enlarged view of the chain of plates, fenders, and float, showing the points of connection of conductors and tackle. Fig. 3 is a side view of two of the plates turned one-half way around from their position in Fig. 2 to further illustrate the connecting devices.

Considering Fig. 1, numeral 1 marks the hull, and 2 the sheathing, of a vessel. To fit the curve of the side, a zinc plate 3 is bent, as shown, and is provided with insulating-fenders 4 and 5 at its ends. An insulated conductor 6 in metallic connection with the plate leads through fender 4 aboardship and by way of galvanometer 7 is connected with any point of the sheathing. To the ends of the plate ropes 8 and 9 are tied in suitable eyes 10 and 11. Rope 9 passes under the keel and serves to draw the plate downward, while a pull upon rope 8 would obviously have an opposite effect. By slacking rope 9 and moving rope 8 along the side it is believed to be clear that the plate may be caused to take up its position at any point of the vessel's exterior from stem to stern.

By means of a switch 12 a battery or other source of current electricity may be included in the circuit in order to accelerate or intensify the chemism, as hereinafter explained.

Fig. 2 represents a chain of plates 13, 14, 15, and 16, which is the lowest of the chain. To the upper end of plate 13 an insulating-fender 17 is fixed by a screw 18 or in any other convenient and effective manner. It will be observed that the fenders project beyond the plates, thus preventing contact with the sheathing and preserving an intermediate body of liquid. While ordinarily rectangular in form, I do not limit myself to any particular shape for the insulating-fenders. At the lower end of plate 13 there is a second fender 19. To connect the plates in metallic continuity, a pin 20 is passed through the ears 21 and 22, provided at the lower ends of the uppermost plate 13, and the intermediate plates 14 and 15, and through eyes 23, disposed between the ears, as shown in Fig. 3. All plates excepting the top one have the eyes 23. In Figs. 2 and 3 it will be noted that the fenders 19, 24, and 25 are placed upon and about the ears 21 and 22 against the ends of the plates. With the fenders in position the pins 20 cannot work out. By means of the devices just described a sufficient metallic connection is made between the plates to carry the current with little resistance, while permitting the necessary pivotal movement to enable the chain to follow the curve of the side.

At the lower end of plate 16 is insulating-fender 26, secured by the screw 27. Considering together the fenders 17 and 26, it will be noticed that they are pierced near their opposite sides each by two orifices 28. Through the outside orifice of fender 17 rope 8 passes, being knotted below or otherwise tied to the fender. Also the conductor 6 is passed through fender 17 and made a metallic continuation of the chain of plates. The rope and conductor lead aboardship, as set out in connection with the form of my invention illustrated in Fig. 1 and explained hereinabove. Through the outer orifice of fender 26 the rope 9 passes and continues through the float 29, of suitable material and construction, the rope being knotted beyond the float and before the fender. I employ the float to raise the lower end of the chain of plates into angles, such as formed by the bilge-keel 30. It will be readily understood that if the lower end of the chain were not so rendered buoyant as rope 9 was tightened the lower end of the chain would be drawn away from the sheathing to an inefficient distance and if rope 9 were slackened the lower end of the chain would fall. Those connecting portions of the chain of plates that are intended simply as connections are coated with protecting-paint.

As drawn, the four plates 13, 14, 15, and 16 are not curved, but are perfectly straight on both sides or faces; nor are they so long as the single curved plate delineated in Fig. 1. Assuming that the ropes are changed from outer to inner orifices 28 through end fenders 17 and 26, it is thought to be apparent that the entire chain of plates may be turned over and the faces outermost in Fig. 2 directly presented toward the sheathing. Therefore both faces of the zincs can be used, with consequent economy, and the position of the chain changed from time to time along the side of the vessel.

It has been found by trial that the current set up by the construction and arrangement specified loosens the oxids and removes therewith all attached growths. If such obstructions are unusually refractory, I employ an additional current to aid the process, generated by a battery 31 or other source.

Having thus described my invention, what I claim, and desire to secure by Letters Patent of the United States, is—

1. In an electrolytic ship-bottom cleaner, the combination of a conducting-plate, tackle constructed to suspend said plate from the vessel movably contiguous to the side of the vessel below the water-line, insulating-fenders arranged to prevent contact between said plate and the sheathing or hull of the vessel, a conductor leading aboard from said plate, a source of electricity having one pole connected with said conductor and the remaining pole connected with the sheathing of the vessel, substantially as described.

2. In an electrolytic ship-bottom cleaner, the combination of a zinc plate, tackle constructed to suspend said plate from the vessel movably contiguous to the side of the vessel below the water-line, insulating-fenders arranged to prevent contact between said plate and the sheathing or hull of the vessel, a conductor leading aboard from said plate, a conductor leading inboard from the sheathing of the vessel, the said conductors being adapted for connection with each other, substantially as described.

3. In an electrolytic ship-bottom cleaner, the combination of a zinc plate, a rope connected with one end of said plate and passing upward aboard the vessel, a rope connected with the opposite end of said plate and passing beneath the vessel and aboard up the other side, a conductor leading aboard from said plate, a conductor leading inboard from the sheathing of the vessel, the said conductors being adapted for connection with each other, and insulating-fenders arranged to prevent contact between the said plate and sheathing, substantially as described.

4. In an electrolytic ship-bottom cleaner, the combination of a chain of zinc plates in metallic and pivotal connection with each other, a rope connected with one end of said chain and passing upward aboard the vessel, a rope connected with the opposite end of said chain and passing beneath the vessel and aboard up the other side, a conductor leading aboard from said chain of plates, a conductor leading inboard from the sheathing of the vessel, the said conductors being adapted for connection with each other, and insulating-fenders arranged to prevent contact between the said plates and sheathing, substantially as described.

5. In an electrolytic ship-bottom cleaner, the combination of a chain of zinc plates in metallic and pivotal connection with each other, a rope connected with one end of said chain and passing upward aboard the vessel, a rope connected with the opposite end of said chain and passing beneath the vessel and aboard up the other side, a conductor leading aboard from said chain of plates, a conductor leading inboard from the sheathing of the vessel, the said conductors being adapted for connection with each other, insulating-fenders arranged to prevent contact between the said plates and sheathing, and a float secured to said chain of plates, substantially as described.

6. In an electrolytic ship-bottom cleaner, the combination with a conducting-plate supported contiguous to the side of the vessel below the water-line, of insulating-fenders arranged to prevent contact between said plate and the sheathing or hull of the vessel, a conductor leading aboard from said plate, a source of electricity having one pole connected with the said conductor and the remaining pole connected with the sheathing of the vessel, substantially as described.

In testimony whereof I affix my signature in presence of two witnesses.

GEORGE W. FRAZIER.

Witnesses:
 JOHN NOLAND,
 J. P. APPLEMAN.